Aug. 18, 1959 S. W. NICKELLS 2,900,163
DIAPHRAGM VALVE
Filed July 10, 1957
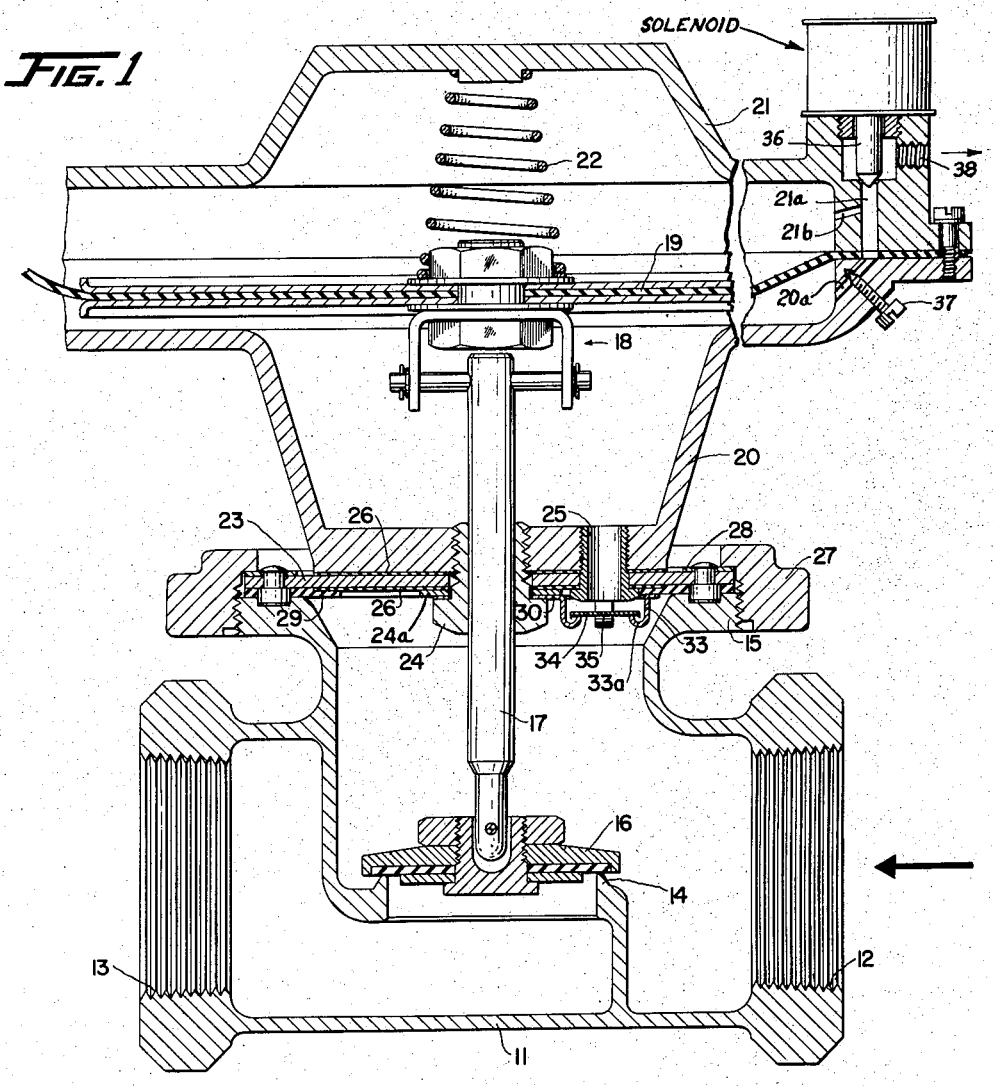
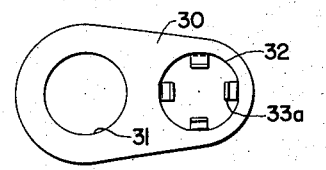
INVENTOR.
STANLEY W. NICKELLS
BY
ATTORNEY United States Patent Office 2,900,163
Patented Aug. 18, 1959

2,900,163

DIAPHRAGM VALVE

Stanley W. Nickells, Wayzata, Minn., assignor to Minneapolis-Honeywell Regulator Company, Minneapolis, Minn., a corporation of Delaware Application July 10, 1957, Serial No. 670,967

9 Claims. (Cl. 251—30)

This invention relates to pressure operated valves and, more particularly, to valves of this type wherein means is provided to prevent sudden surges of fluid in the supply line to the valve from popping the valve open from its closed position.

There has been a long standing need for such a valve and especially for a simple, reliable and inexpensive one to prevent undesired opening of a pressure operated valve, due to line surges, so it is an object of this invention to provide just such a valve.

Another object of the invention is to provide a simple, sturdy and reliable check valve that is adapted to be placed between the inlet of a valve and a pressure motor to prevent sudden surges of fluid into the inlet from reaching the motor.

Another object of the invention is to provide a surge nullifier valve that may be readily applied to existing valves as well as newly manufactured valves.

Still further objects of the invention will become apparent upon reading the following detailed description of the invention in conjunction with the accompanying drawing wherein:

Figure 1 is a fragmentary and vertical sectional view of the valve embodying the invention; and Figure 2 is a plan view of the cage or support for the check or surge nullifier valve.

The valve body 11, having a threaded inlet 12, a threaded outlet 13, a valve seat 14 therebetween, and an externally threaded open top portion 15, is of conventional construction. A valve disc 16, carried by a valve stem 17, is positioned to cooperate with said valve seat to control the flow of fluid through the valve body. It is connected at its upper end by means of a conventional coupling member 18 to a diaphragm 19 which is adapted to actuate the valve stem and valve.

The diaphragm forms a part of a conventional diaphragm motor having a lower casting 20 and an upper casting 21, between which the marginal edge of the diaphragm is clamped. A coil compression spring 22 normally biases the diaphragm 19 downwardly to a position causing the valve 16 to seat on the valve seat 14. A plate 23 is secured to the bottom of the lower casting 20 by means of a hollow bolt 24, which also serves as a guide for the valve stem 17, and a hollow bolt 25 that serves as a passage for the flow of fluid from the inlet of the valve body to the chamber below the diaphragm 19. Gaskets 26 and 26, between the casting 20 and the plate 23 and the head of the bolt 24 and the plate 23, respectively, provide gas tight seals between the casting 20 and the plate 23.

The plate 23 is clamped to the upper portion 15 of the valve body by means of a ring-shaped clamp or bonnet nut 27. The washers 28 and 29 are riveted to the top and bottom surfaces of the plate 23, respectively, to provide a gas tight seal between the plate and the nut 27 and the plate and the body portion 15, respectively. The rivets fit in an annular groove in the body to provide proper alignment.

A cage member 30 has an aperture 31 therein, at one end thereof, and an aperture 32 at the other end thereof. Downwardly struck fingers 33 around the opening 32 have radial, inwardly and upwardly extending end portions 33a that provide a cage and a support for a disc valve 34. This valve preferably has a very small opening 35 therein so that when the valve 34 is seated against the lower end of the bolt 25, a limited amount of fluid may pass from the inlet into the chamber below the diaphragm 19. As can be seen in the drawing, the cage 30 is secured to the underside of the plates 23 by means of the bolt 24 extending through the opening 31, thus holding the cage 30 against a washer 24a, which, in turn, bears against the gasket 26 on the lower side of the plate 23. It is thus seen that the cage and valve 34 may be readily added to existing valves of this type as well as to so assemble them at the time of their manufacture.

Obviously, other types of means may be used to support the cage so as to hold the valve 34 in a position to close the inner end of the bolt 25 of the valve illustrated in the drawing or over a corresponding opening in another valve of a similar type.

As can be seen from the drawing, the chamber below the diaphragm 19 is normally in constant communication with the inlet chamber of the valve body so that fluid from the supply source may freely flow from the inlet into this chamber. The diaphragm motor is of the conventional type wherein fluid may flow from the chamber below the diaphragm 19 through a restriction or orifice either in the diaphragm 19 itself or in passages 20a, 21a, and 21b in the castings 20 and 21 leading from the chamber below the diaphragm to the chamber above the diaphragm, with the fluid pressure in the upper chamber being controlled by means of the illustrated conventional single seated pilot valve or by means of a double seated pilot valve (not shown) that either prevents leakage of fluid from above the diaphragm while allowing flow from below the diaphragm to the top chamber or permits flow from the upper chamber while closing the opening from beneath the diaphragm, depending upon the position of the pilot valve.

The illustrated pilot valve is of the constant bleed type in that when the solenoid valve 36 is energized to its open position, gas can escape from the chamber below diaphragm 19 through the restricted passage 20a, having an adjustable needle valve 37 therein, through passage 21a to threaded outlet 38 and from there through a conduit (not shown) to the atmosphere, preferably to a burner in a furnace where the gas can be burned. Gas will escape also from the chamber above the diaphragm, at a slightly greater rate than from below the diaphragm, through the restricted passage 21b and 21a to the outlet 38. At no time will gas be able to escape from the chamber above the diaphragm at a rate that would cause the disc valve to lift against the lower end of the hollow bolt 25, due to flow of gas through the bolt as the diaphragm moves upwardly. The same would be true if a double seated pilot valve were used, such as the one illustrated in W. L. Huntington Patent No. 2,667,897, in place of the one illustrated. In such a substitution, Huntington's passages 7, 8 and 19 would connect with passages 20a, 21b and 38, respectively.

When there is substantially only atmospheric pressure in the upper chamber, the pressure in the lower chamber is sufficient to overcome the bias of the spring 22 to raise the valve 16 to its full open position. When the pilot valve is in its closed position, preventing bleeding of fluid from the upper chamber, pressure in the upper chamber will become equal to the pressure in the lower chamber and the spring 22 cause full closing of the valve 16. By providing a control member that causes varying positions of the pilot valve, providing varying amounts of bleeding of fluid from the upper chamber, the pressure of the fluid in the upper chamber will be varied and thus cause varied positions of the valve 16. This functioning of the valve is conventional in the prior art. As illustrated, the pilot valve is of the on-off type providing on-off control of the main valve.

With the valve element in the position shown in the drawing, that is, with the pilot valve closed and the main valve 16 closed, any sudden increase in the pressure of the fluid being delivered to the valve inlet, that would result in a surge of fluid into the chamber below the diaphragm of a magnitude sufficient to cause lifting of the diaphragm 19, will be sufficient to lift the valve 34 off of it supporting fingers 33 and carry it into seating engagement with the lower end of the hollow bolt 25. This will prevent the building up of sufficient pressure in the lower chamber so as to cause the valve 16 to pop open and thus deliver an undesired quantity of fluid through the outlet of the valve. A small hole 35 in the valve 34 will prevent the valve 34 from being permanently held against the bottom of the hollow bolt 25 by permitting a limited amount of fluid to leak therethrough into the lower chamber at a rate not greater than the rate the fluid in the lower chamber can leak on into the upper chamber through the orifice mentioned above. As soon as the pressure in the chamber below the diaphragm is equal to the pressure in the inlet of the valve, the disc valve 34 will drop by its own weight to its normal position on the fingers 33.

While the preferred embodiment of the invention has been described above, it is deemed to be obvious that modifications may be made therein without departing from the spirit of the invention. Therefore, it is to be understood that the scope of the invention is to be determined from the appended claims.

I claim:

1. A pressure operated valve comprising a valve body having an inlet and an outlet with a valve seat therebetween, a valve cooperable with said valve seat and normally biased into closed position on said seat, a movable wall connected to said valve and positioned in a chamber separated from said inlet, a pasasge between said inlet and said chamber, means at the inlet end of said passage and responsive to fluid flow surges to substantially close said passage and thus prevent undesired opening of said valve.

2. A diaphragm valve comprising a valve body having an inlet and an outlet with a valve seat therebetween, a valve cooperable with said valve seat and normally biased into closed position on said seat, a diaphragm connected to said valve and positioned in a chamber separated from said inlet, said valve being operable between open and closed positions in response to changes in pressure above said diaphragm, a passage between said inlet and said chamber, means at the inlet end of said passage and responsive to fluid flow surges to substantially close said passage and thus prevent fluid surge opening of said valve.

3. A pressure operated valve comprising a valve body having an inlet and an outlet with a valve seat therebetween, a valve cooperable with said valve seat and normally biased into closed position on said seat, a movable wall connected to said valve and positioned in a chamber separated from said inlet, a passage between said inlet and said chamber, valve means supported adjacent to but spaced from the inlet end of said passage and responsive to fluid flow surges to substantially close said passage and thus prevent undesired opening of said valve.

4. In a diaphragm valve of the type controlled by a pilot valve and with one side of the diaphragm constantly exposed through a passage to fluid pressure in the valve inlet, the combination comprising flow responsive valve means positioned to substantially stop fluid flow from said inlet to said diaphragm upon occurrence of a fluid surge in said inlet to prevent undesired opening of the valve operated by said diaphragm.

5. In a diaphragm valve of the type controlled by a pilot valve and with one side of the diaphragm constantly exposed through a passage to fluid pressure in the valve inlet, the combination comprising flow responsive valve means normally inoperable during substantially steady operating fluid pressures but positioned to substantially stop fluid flow from said inlet to said diaphragm upon occurence of a fluid surge in said inlet to prevent undesired opening of the diaphragm operated valve.

6. In a diaphragm valve of the type controlled by a pilot valve and with one side of the diaphragm constantly exposed through a passage to fluid pressure in the valve inlet, the combination comprising flow responsive valve means positioned at the inlet end of said passage and supported by a guide for said diaphragm valve, to substantially stop fluid flow from said inlet to said diaphragm upon occurrence of the fluid surge in said inlet sufficient to lift said valve against the opening into said passage to prevent undesired opening of the diaphragm operated valve.

7. A flow responsive valve for use in pressure operated valves comprising a cage formed out of sheet metal, said cage having a plurality of fingers extending downwardly and radially inwardly around the periphery of an aperture in said sheet, said sheet having a second aperture therein through which the stem of a pressure operated valve and its guide may extend, said sheet being so shaped that when assembled in a pressure operated valve having a passage between the pressure motor and the valve inlet, the fingers are positioned around the inlet end of said passage, and a disc of relatively light material within said cage and responsive to fluid surges in said inlet to substantially close said passage and prevent opening of the pressure operated valve.

8. A flow responsive valve for use in pressure operated valves comprising a cage support, said cage having a plurality of fingers extending downwardly and radially inwardly around the periphery of an aperture in said support, said support having a second aperture therein through which the stem of a pressure operated valve and its guide may extend, said support being so shaped that when assembled in a pressure operated valve having a passage between the pressure motor and the valve inlet, the fingers are positioned around the inlet end of said passage, and means of relatively light material within said cage and responsive to fluid surges in said inlet to substantially close said passage and prevent opening of the pressure operated valve.

9. A flow responsive valve for use in pressure operated valves comprising a cage support, said support having a plurality of L-shaped fingers extending downwardly and radially inwardly around the periphery of an aperture therein, said support having a second aperture therein through which the stem of a pressure operated valve and its guide may extend said support being so shaped that when assembled in a pressure operated valve having a passage between the pressure motor and the valve inlet, the fingers are positioned around the inlet end of said passage, and a disc of relatively light material within the cage of said support and responsive to fluid surges in said inlet to close said passage and prevent opening of the pressure operated valve.

No references cited.